United States Patent
M

(10) Patent No.: US 9,622,127 B2
(45) Date of Patent: Apr. 11, 2017

(54) METHOD AND SYSTEM FOR WIRELESS COMMUNICATION

(71) Applicant: Tejas Networks Limited, Bangalore, Karnataka (IN)

(72) Inventor: Vinod Kumar. M, Karnataka (IN)

(73) Assignee: Tejas Networks Limited, Bangalore, Karnataka (IN)

( * ) Notice: Subject to any disclaimer, the term of this patent is extended or adjusted under 35 U.S.C. 154(b) by 0 days.

(21) Appl. No.: 14/093,069

(22) Filed: Nov. 29, 2013

(65) Prior Publication Data
US 2014/0155071 A1    Jun. 5, 2014

(30) Foreign Application Priority Data

Nov. 30, 2012  (IN) .......................... 4995/CHE/2012

(51) Int. Cl.
*H04W 36/00* (2009.01)
*H04W 36/08* (2009.01)
*H04W 16/12* (2009.01)
H04W 36/30 (2009.01)

(52) U.S. Cl.
CPC ........... *H04W 36/08* (2013.01); *H04W 16/12* (2013.01); *H04W 36/30* (2013.01)

(58) Field of Classification Search
CPC .................. H04W 4/00; H04W 4/008; H04W 36/00–36/365; H04W 80/04; H04W 28/04; H04L 2012/5607; H04L 1/06
USPC ........ 455/41.2, 41.3, 436–444, 552.1, 553.1, 455/561; 370/310.2, 331–334, 338
See application file for complete search history.

(56) References Cited

U.S. PATENT DOCUMENTS

| | | | |
|---|---|---|---|
| 6,456,858 B1 * | 9/2002 | Streter | 455/552.1 |
| 7,260,399 B1 * | 8/2007 | Oh et al. | 455/436 |
| 7,343,160 B2 * | 3/2008 | Morton | 455/444 |
| 7,477,897 B2 * | 1/2009 | Bye | 455/436 |
| 8,095,175 B2 * | 1/2012 | Todd et al. | 455/552.1 |
| 8,374,548 B2 * | 2/2013 | Parkkinen et al. | 455/41.2 |
| 8,886,261 B2 * | 11/2014 | Aerrabotu | 455/574 |
| 2003/0003918 A1 * | 1/2003 | Proctor | H04W 16/14 455/446 |
| 2004/0029612 A1 * | 2/2004 | Gorsuch | 455/552.1 |
| 2004/0090937 A1 * | 5/2004 | Chaskar et al. | 370/331 |
| 2004/0233840 A1 * | 11/2004 | Bye | H04W 76/02 370/210 |

(Continued)

*Primary Examiner* — Steve D Agosta
(74) *Attorney, Agent, or Firm* — Merchant & Gould P.C.

(57) ABSTRACT

A method and system for bandwidth allocation in a wireless communication system, by assigning at least one specific frequency, called hand-off frequency, to one or more base station called as hand-off base station (HBS) located within the service area, for handing off subscriber stations between at least two cells, wherein the said hand-off frequency is not used by the base station of the said two cells for serving subscriber stations and wherein, hand-off is triggered when received signal strength at serving base station, hand-off base station or at subscriber station is below acceptable value and assigning frequencies, other than the hand-off frequency, to the base stations called as serving base stations (SBS) located within the cells of the service area, for serving the subscriber stations within the cell. The method further comprising of regulating the signal transmission strength of the serving base station.

14 Claims, 5 Drawing Sheets

(56) References Cited

U.S. PATENT DOCUMENTS

| | | | |
|---|---|---|---|
| 2006/0002323 A1* | 1/2006 | Hildebrand et al. | 370/321 |
| 2009/0170519 A1* | 7/2009 | Wilhoite et al. | 455/436 |
| 2011/0217974 A1* | 9/2011 | Naka | H04B 1/707 |
| | | | 455/423 |

* cited by examiner

METHOD AND SYSTEM FOR WIRELESS COMMUNICATION

REFERENCE TO PRIORITY APPLICATION

This application claims priority from Indian Non-provisional Application Serial No. 4995/CHE/2012 filed Nov. 30, 2012, entitled "METHOD AND SYSTEM FOR WIRELESS COMMUNICATION", which is incorporated herein by reference in its entirety.

FIELD OF INVENTION

The present invention relates to a wireless communication system and more particularly to radio frequency allocation for maximising spectral efficiency.

BACKGROUND OF THE INVENTION

Wireless communication system is a collection of devices in a network that provide wireless communications according to one or more wireless protocols. The wireless communication system devices, for example may include at least a subscriber station or mobile station, multiple base stations/ eNodeB's, mobility management entities (MMEs), serving gate way, network management system (NMS) server etc., with the subscriber stations or mobile stations interacting with multiple base stations via the wireless communication protocols supported by that wireless network. Wireless communication systems use electromagnetic waves to communicate with wireless communication devices located within radio cells associated with each base station.

The subscriber station, mobile station or user equipment frequently use communication services such as call connection, digital broadcast, digital media downloading, uploading, and so on, via the base station in a wireless network. Therefore there is an ever-increasing demand for wireless communication services that requires the service providers of such systems to make maximum use of available radio frequency bandwidth. A network operator in a service area is typically allocated a geographical territory and a limited bandwidth is provisioned for that geographical area. The use of the radio spectrum is regulated by many governments through frequency allocation. Since there exists a limitation of available frequencies in a wireless communication system, the allocated frequencies are assigned to the base station depending on their services.

For serving more number of subscribers and to reduce power consumption the geographical location or area is split into cells, usually a hexagonal cell. A number of base stations are deployed throughout the demarcated territory, such that one base station is located in each cell. Each cell or subscribers in the cell are covered or served by a single base-station. Ideally the network operators want to use entire available frequency band in all the cells. But, the fundamental challenge is, if the same frequency or carrier frequency of the allotted bandwidth is used by two adjacent base-stations for serving their respective subscribers then this will inevitably cause inter-cell interference. To prevent this interference from neighboring cells, the band of frequency is distributed among the cells such that inter-cell interference is minimized. The increasing complexity and dynamic environment in current wireless communication networks often require constant analysis, provisioning and tuning to achieve maximum operational efficiency. Since the wireless communication networks can include network devices spread over great geographical areas involving a large number of parameters, there is a need for utilizing the entire allocated bandwidth in a service area instead of distributing the allocated bandwidth among the base stations, thus meeting the growing demands of wireless communication services.

SUMMARY OF THE INVENTION

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below.

The present invention and its embodiments are made to provide for a feasible solution for deploying the entire frequency band allocated to the service provider in each cell or sector of a cell associated with a base station, thus facilitating utmost spectral efficiency in a wireless communication system.

An aspect of the invention provides for a method of assigning at least one specific frequency, called hand-off frequency, to one or more base station called as hand-off base station (HBS) located within the service area, for handing off subscriber stations between at least two cells wherein, the said hand-off frequency is not used by the base station of the said two cells for serving subscriber stations and wherein, hand-off is triggered when received signal strength at serving base station, hand-off base station or at subscriber station is below acceptable value Another aspect of the invention provides for a method of assigning frequencies other than the hand-off frequency, to the base stations called as serving base stations (SBS) located within the cells of the service area, for serving the subscriber stations within the cell.

Another aspect relates to regulating or controlling the signal transmission strength of the serving base station such that the area surrounding each serving base station in a cell is partitioned as complete coverage area and hand-off region wherein, the hand-off region extends from the boundary of the complete coverage area of a serving base station to the complete coverage area of the immediate neighbouring serving base stations.

Another aspect relates to selecting one or more dedicated hand-off base station or selecting a hand-off base station from one among the serving base stations in a service area such that the hand-off frequency transmitted with certain power, covers the entire service area.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The features, advantages and other aspects of the embodiments of the present invention will be obvious to any person skilled in the art to appreciate the invention when read with the following description taken in conjunction with the accompanying drawings.

DETAILED DESCRIPTION

Figure 1:
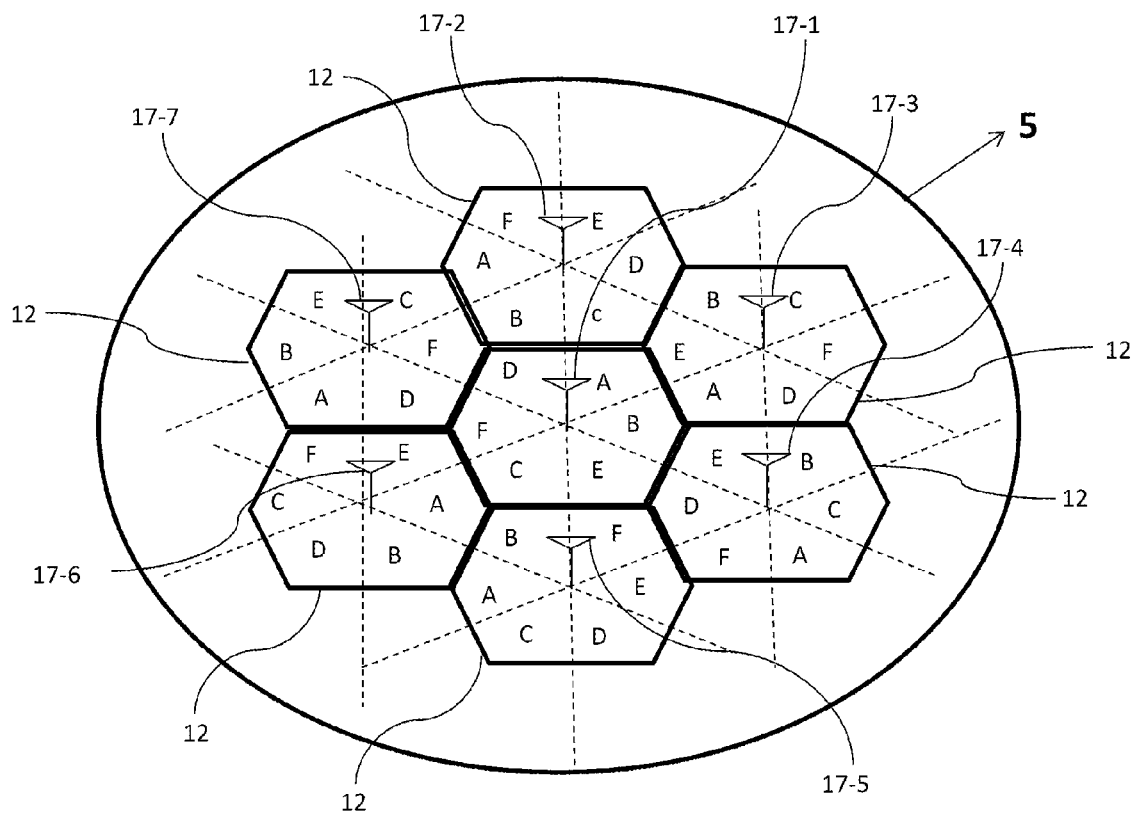
FIG. 1 illustrates a wireless communication deployment scenario with respect to a geographical area allocated to a service provider as known in prior art.

The following descriptions with reference to the accompanying drawings are provided to assist in a comprehensive understanding of exemplary embodiments of the invention as defined by the claims and their equivalents. Further, in the following description circuits, structures and techniques have not been shown in detail in order not to obscure the understanding of the description. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The term component, system and the like are intended to refer to an entity or entities within a communication network node comprising of; hardware, software, a combination of hardware and software. For e.g., a component may be, but not limited to being, a process running on a processor, a processor, an integrated circuit, or a computer. The system components may communicate by way of local and/or remote processes.

Example embodiments to be described below are not intended to limit the present invention to any specific example, embodiment, environment, applications, or particular implementations described in these example embodiments. It should be appreciated that, in the following example embodiments and the attached drawings are illustrated for the ease of understanding, but not to limit the actual scale.

The techniques described herein may be used for various wireless communication networks such as WiMax, CDMA networks, CDMA implementing radio technology such as UTRA, TDMA networks, TDMA implementing radio technology such as GSM, FDMA networks, OFDMA networks, OFDDA implementing radio technology such as Evolved URTA (E-UTRA), SC-FDMA networks. Embodiments of the present invention may be applicable for/in any kind of modern and future communication network including any mobile/wireless communication networks/systems.

Subscriber station used in the following description denotes a stationary or mobile wireless communication device. Examples of a stationary wireless device may include desktop computers and computer servers. Examples of a mobile wireless device may include user equipment (UE), access terminal (AT), wireless communication device, terminal, wireless handset, computer or wireless module, wireless module for use with a computer, personal digital assistant (PDA), tablet computer or device. A subscriber station may be any communication device capable of wirelessly communicating with base stations.

Base station used in the following description includes all terminologies for e.g., eNodeB, access points (APs), radio access stations (RASs), wireless area network stations, access nodes (ANs), base transceiver stations (BTSs), base site controllers (BSCs), radio network controllers (RNCs), relay node (RN) referred in the context of a network equipment or device used for providing services to the subscriber stations, depending on the wireless access technology. The words geographical area and service area are interchangeably used to refer to one and the same geographical jurisdiction allotted to a service provider to provide wireless communication services within that jurisdiction. Those skilled in the art will recognize that FIGS. 1 to 5 does not depict all of the network equipment necessary for wireless communication system to operate but only those system components and logical entities particularly relevant to the description of the embodiments herein are shown.

FIG. 1 illustrates a wireless communication deployment scenario with respect to a geographical area 5 allocated to a service provider as known in prior art. The service provider divides the service area by deploying antenna sites or base stations (17-1 to 17-7) upon an idealized model of cell placement, which is usually a grid of hexagonally shaped cells 12. These hexagonally shaped cells each include an array of six directional sector antennas. The sector antennas are centrally located in each cell to radiate into a sub-portion of the cell such as a sixty degree arc also called as sixty-degree sector or simply a sector.

Each sector has a group of frequencies assigned to it from among the entire allocated bandwidth of the service provider. The frequency assignment is such that no adjacent sectors use the same frequency groups. From the FIG. 1 it is clear that base station 17-1 to 17-7 is sectored into six groups with the group of frequencies A, B, C, D, E and F assigned in such way that no adjacent base stations, from among the base stations 17-1 to 17-7 are similarly grouped to match the group of frequencies assigned to each base station. This considerably reduces inter-cell interference and also facilitates interruption-less communication between the mobile station and the base station.

In the above scenario, the entire allocated bandwidth is divided as six frequency groups and distributed among six sectors for each seven cells spread in the geographical area 10. Though the above method provides minimum or no inter-cell interference, it comes at the cost of sacrificing spectral efficiency.

Figure 2:
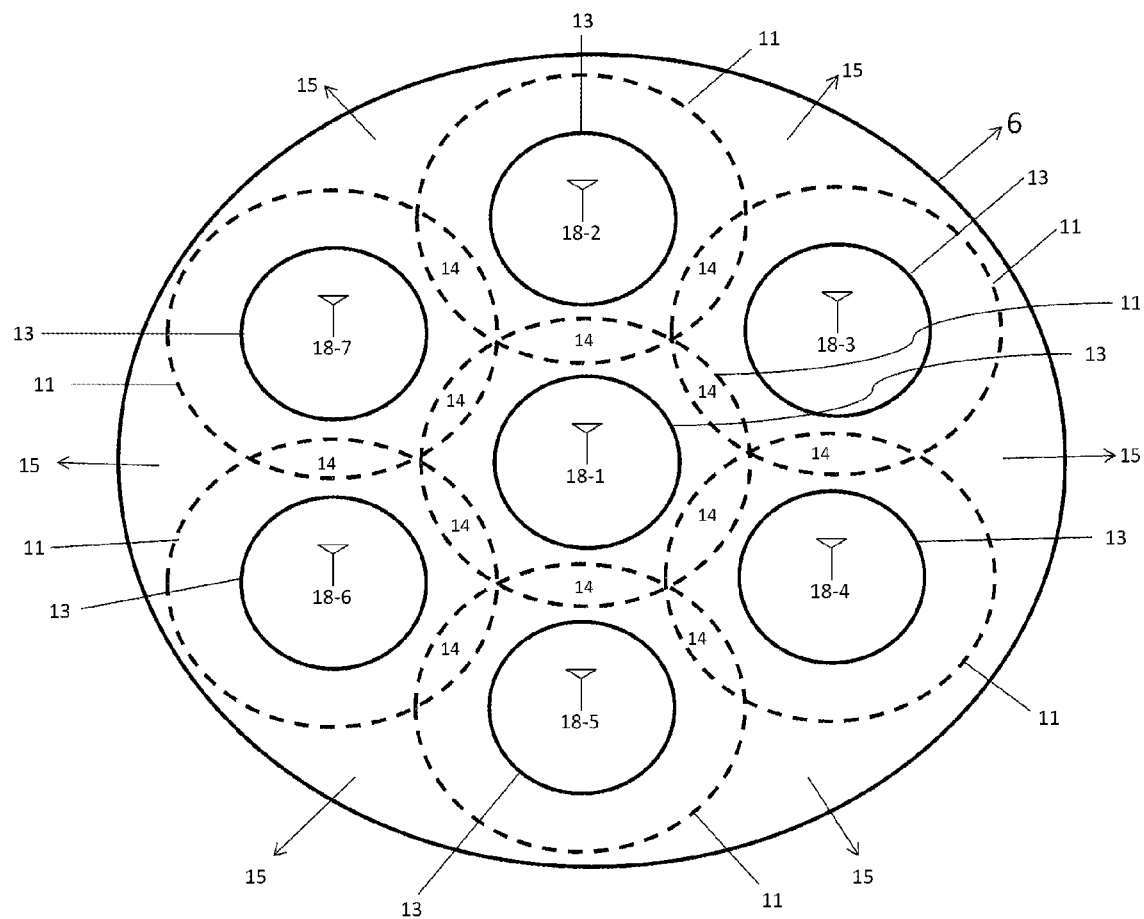
FIG. 2 illustrates yet another wireless communication deployment scenario with respect to a geographical area allocated to a service provider as known in the prior art.

FIG. 2 illustrates yet another wireless communication deployment scenario with respect to a geographical area 6 allocated to a service provider as known in the prior art. The service provider divides the service area by deploying antenna sites or base stations (18-1 to 18-7). Based on transmission power of the base station associated with each cell the transmit carrier frequency of each cell can be conveniently segregated as the cell center area or cell center 13 which is closer to the base station and the cell edge area or cell edge or outer circle area or outer circle 11 where the carrier frequency strength is weak. Any subscriber station within the cell edge 11 experiences weak signals and it forms the transit point for the handover of the subscriber station to the adjacent base station depending on the movement of the subscriber station within cells and the respective base station signal strength. Any subscriber terminal within the area 15 will be completely out of any frequency coverage of any of the base stations.

Each service provider is allocated limited bandwidth for the respective geographical area. The service provider then determines how to split up the allocated bandwidth among the cells. This forms an effort to minimize the interference between adjacent base stations while determining how best to reuse the frequencies in the allocated bandwidth.

In the above known prior art, cell center 13 is closer to the base station and so it is particularly immune to similar frequency interference from adjacent base stations. Therefore the service provider may prefer to allocate at least 80 percent of the frequency spectrum from among the entire allocated bandwidth, which means that the cell centers 13 of each base station 18-1 to 18-7 are operating with the spectral efficiency of 80 percent. The remaining 20 percent is allocated to the cell edges or outer circles 11 of each base station 18-1 to 18-7 such that the allocated frequency at overlapping points 14 is mutually distinct frequencies so that inter-cell interference is minimized.

Figure 3:
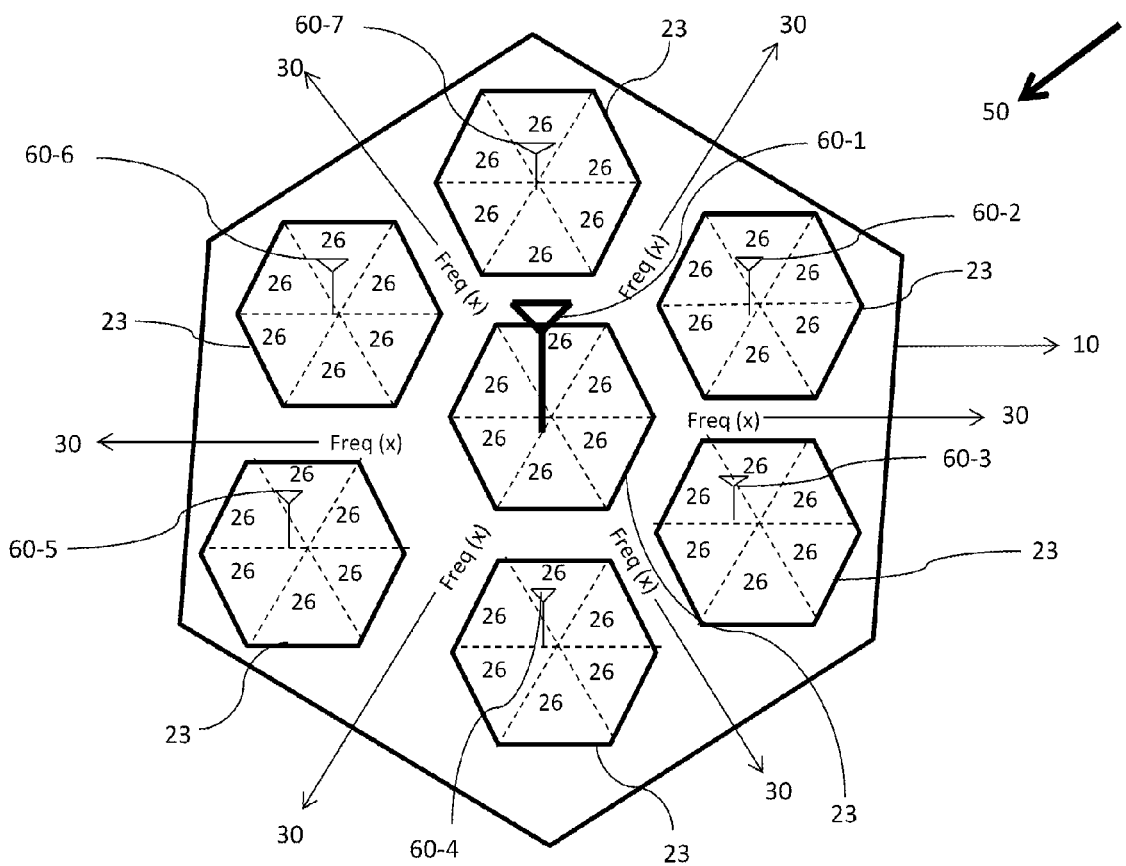
FIG. 3 illustrates bandwidth allocation in a wireless communication system with respect to a geographical area, where the subject matter of the embodiments of the invention is deployed.

FIG. 3 illustrates bandwidth allocation in a wireless communication system 50 with respect to a geographical area 10 in which the invention may be advantageously employed. The system 50 includes a plurality of antenna or base stations 60 spread over finite distances apart such that their deployment covers the entire geographical area assigned to the service provider.

As illustrated, the geographical area served in each cell 23 is organized into cells 23, with each cell 23 being further divided into six sectors 26. A base station 60 is thus associated with each cell 23. These hexagonally shaped cells may include an array of six directional sector antennas to radiate into a sub-portion of the cell at any desired angle, such that the propagating frequencies cover the entire cell 23 or a single omni-directional antenna radiating all the 360 degrees covering the entire cell 23.

It is to be understood that cell structure in hexagonal shape is to simplify the figure. It is an approximation of cell shapes, and that other shapes are possible, i.e., depending on the demography, traffic density, geography and topology. Similarly, the sectors can be of arbitrary shapes for e.g., circular or ellipse.

Assuming that the service provider within the geographical area 10 is allotted a frequency band F. Out of the entire allocated bandwidth F assigned to the service provider at least one carrier frequency (x) (hereinafter referred to as hand-off frequency(x)) is chosen for assigning it for the exclusive use of a base station hereinafter referred to as hand-off base station (HBS).

The hand-off base station may be one or more dedicated base stations located strategically within the geographical area 10 such that the hand-off frequency (x) transmitted with certain transmission power, covers the entire service area 10. The strategic placement of the hand-off base station within the service area 10 can either be in a remote non-coverage area or within close proximity to other base stations. The criteria or deciding factor for strategic placement of such hand-off base stations will be based on the condition that the hand-off frequency (x) transmitted with certain transmission power covers the entire service area.

The hand-off base station may also be ideally selected from among the base stations in a service area 10, such that the hand-off frequency (x) transmitted with certain transmission power, covers the entire service area 10. Depending on network topology and/or service area constraints, a beam forming antenna with assigned hand-off frequency functions may also serve the purpose of a hand-off base station in radiating hand-off frequency (x) with certain transmission power, covering the entire service area.

As an example, depending on subscriber station density and strategic location, base station 60-1 may be selected from among the base stations 60-1 to 60-7 as it may transmit the hand-off frequency (x) to an extent covering the entire geographical area 10 with a certain transmission power.

Once a hand-off base station 60-1 is selected and assigned the hand-off frequency (x), for its exclusive use, the other base stations 60-2 to 60-7 nomenclature is transformed as serving base stations (hereinafter referred to as serving base station (SBS)) as its function will be limited to serving subscriber stations (not shown in FIG. 3) within its sub-area or cell 23 in the frequency bands (F-x) other than the hand-off frequency (x).

It is to be understood that the entire frequency band F allocated to the service provider (comprising of hand-off frequency (x) and frequencies other than hand-off frequency (F-x)) is allocated to each base station irrespective of whether it is a hand-off base station (60-1) or serving base stations (60-1, 60-2 to 60-7). The difference between a hand-off base station and the serving base stations lies in the component which enables the exclusive use of the hand-off frequency (x) that has been particularly assigned to a particular base station after it had been selected for performing hand-off base station functions depending on its strategic location in the said service area.

The hand-off base station 60-1 performs in a dual aspect as being a hand-off base station to other serving base stations 60-2 to 60-7 and a serving base station to the subscriber stations (not shown in FIG. 3) within its sub-area or cell 23.

Except for the hand-off frequency (x) assigned for the exclusive use of hand-off base station 60-1, all the other carrier frequencies (i.e., F-x) are assigned for the exclusive use of each serving base station 60-1, 60-2 to 60-7 for its exclusive use to serve the subscriber stations (not shown in FIG. 3) within its sector 26, or cell 23. It is to be noted that the hand-off base station 60-1 is also assigned all the other carrier frequencies (F-x) in its capacity as a serving base station, so as to serve the subscriber stations (not shown in FIG. 3) within its sector 26 or cell 23. Thus each serving base station's sector 26, or cell 23 along with the addition of hand-off frequency (x), radiated by the hand-off base station will constitute a complete coverage area with the deployment of all the carrier frequencies that has been allocated to the service provider in the service area 10.

Each serving base station 60-2 to 60-7 including hand-off base station 60-1 in its capacity as serving base station may transmit the entire assigned carrier frequencies (F-x) in all its sectors 26 by using orthogonal frequency division multiplexing (OFDM) which generates channel spectral profiles that are orthogonal to one another without interference when different channels are centered at selected equally spaced frequencies. Under the OFDM, the frequency spacing can be smaller than the minimum spacing in conventional channels and hence increase the number of channels within a given band.

Orthogonal frequency-division multiplexing (OFDM) is a modulation technique used at the physical layer (PHY) of a number of wireless networks, e.g., networks designed according to the well known IEEE 802.16/16e standards. Orthogonal Frequency Division Multiple Access (OFDMA) is a multiple access protocol based on OFDM. In OFDMA, separate sets of orthogonal tones (sub channels or frequencies) and time slots are allocated to multiple transceivers or subscriber stations (MS) by a base station (BS) so that the transceivers can communicate concurrently. OFDMA is widely adopted in many next generation cellular networks such as networked based on 3GPP Long Term Evolution (LTE), and IEEE 802.16m standards due to its effectiveness and variability in radio resource allocation.

The transmission powers of each serving base stations 60-1, 60-2 to 60-7, including the hand-off base station 60-1 may be regulated or controlled such that the broadcasted carrier frequencies (F-x) are confined to cover a finite coverage area matching the sector 26 or sub-area or cell 23. This ensures that the broadcasting of all the assigned carrier frequencies (F-x) are only limited to serve or utilized by the subscriber stations (not shown in FIG. 3) within the cell area 23 thus having utmost spectral efficiency thereby providing high data rate and uninterrupted services to all the subscriber stations within the jurisdiction of the cell 23.

Thus regulating or controlling the broadcasting carrier frequencies (F-x) of serving base stations may give rise to hand-off regions 30 where the serving base stations are unable to provide required radio quality/throughput for the subscriber stations (not shown in FIG. 3). The hand-off base station 60-1 transmits the hand-off frequency (x) to an extent covering the entire geographical area 10 with a certain transmission power. This hand-off frequency (x) is the only frequency available in the hand-off regions 30 and the complete coverage area (i.e., each cell 23) spanning the entire geographical area 10.

Figure 4:
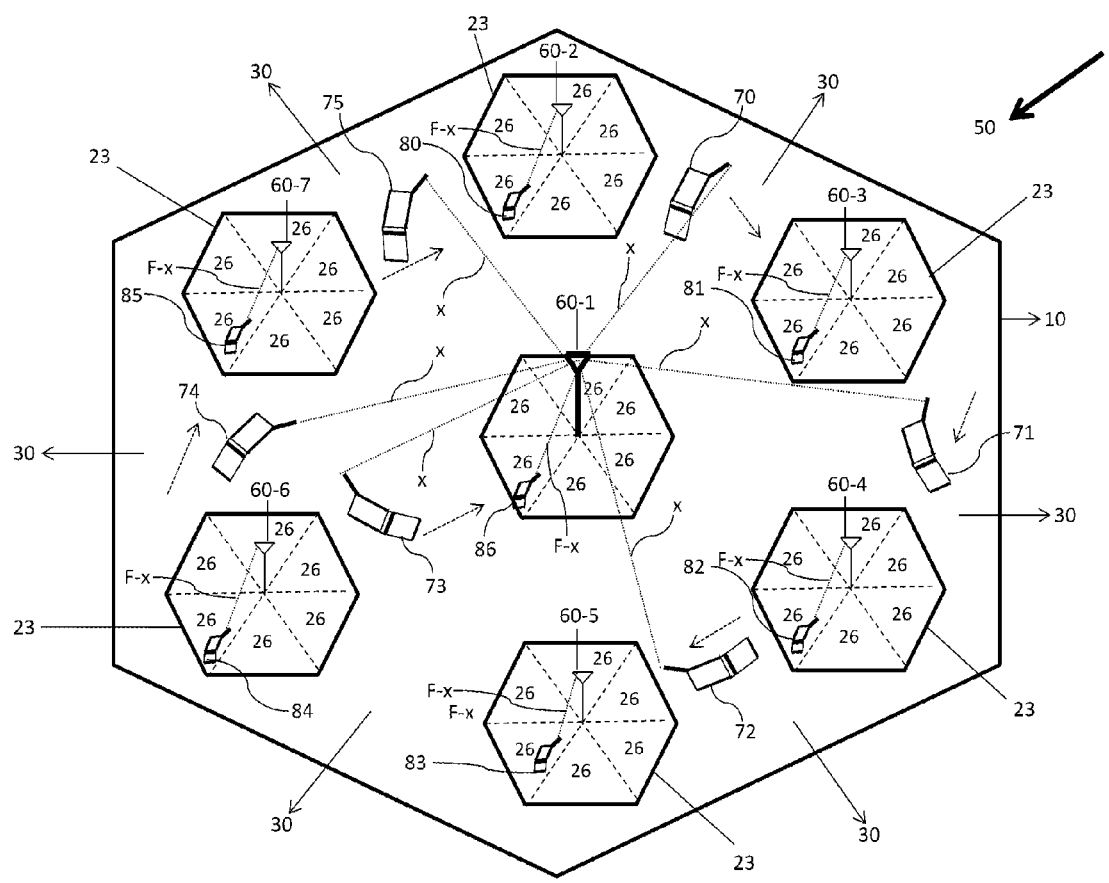
FIG. 4 illustrates bandwidth allocation in a wireless communication system with respect to a geographical area, in accordance with the embodiments of the invention.

As illustrated in FIG. 4, assuming that a subscriber station 86 located within the cell 23 of the hand-off base station 60-1, this subscriber station is served by the hand-off base station 60-1 in the capacity as serving base station within its cell 23. For the sake of clarity and as an example one subscriber station 86 is shown as communicating with the hand-off base station 60-1 in the hand-off base station's capacity as serving base station in the assigned carrier frequency (F-x) for serving base stations. Several such subscriber stations can be served by the hand-off base station 60-1 in the capacity of serving base station with all the available reserved frequencies (F-x), thus considerably increasing the spectral efficiency to one hundred percent with the addition of hand-off frequency (x) spanning the entire geographical area 10 that has been particularly assigned for serving subscriber stations in the hand-off region 30. Similar is the case for each serving base stations 60-2 to 60-7, where several subscriber stations are served with all the assigned frequencies (F-x) allocated in all the sectors of each cell 23 with the addition of hand-off frequency (x) thereby achieving one hundred percent spectral efficiency.

Subscriber stations 70 to 75 in the hand-off regions 30 are served by hand-off base station 60-1 using the hand-off frequency (x). As an example, assuming that the subscriber station 72 which was served by the serving base station 60-4, a while ago has been in movement towards the direction of the neighboring serving base station 60-5. As the subscriber station 72 exits the cell edge of serving base station 60-4, signaling message exchanges between serving base station 60-4, the subscriber station 72 and the hand-off base station 60-1 ensures that the subscriber station 72 switches to hand-off frequency (x) without any interruption to the data communication exchange of the subscriber station 72 while it transits the hand-off region 30. As soon as the subscriber station 72 enters the cell edge of the serving base station 60-5, signaling message exchanges between the hand-off base station 60-1, subscriber station 72 and the serving base station 60-5 ensures that the subscriber station 72 switches to any of the carrier frequencies (F-x) as directed by the serving base station 60-5 without any interruption to the data communication exchange of the subscriber station.

A hand-off can be performed temporarily from within a coverage area (i.e., within cell 23). As an example, an assumption can be made that the subscriber station 84 located within the edge of cell 23 has been experiencing poor signal quality from its serving base station 60-6. The status of subscriber station 84 experiencing poor signal quality below acceptable value, i.e., it may be on the verge of losing complete signal strength, of the serving base station 60-6, is constantly updated to the hand-off base station 60-1 on the hand-off frequency (x). Immediately, subsequent signaling message exchanges between serving base station 60-6, the subscriber station 84 and the hand-off base station 60-1 ensures that the subscriber station 84 switches to hand-off frequency (x) temporarily without any interruption to the data communication exchange. Once the signal strength of the serving base station 60-6 is improved or restored to its full potential, signaling message exchanges between the hand-off base station 60-1, subscriber station 84 and the serving base station 60-6 ensures that the subscriber station 84 switches to any of the carrier frequencies (F-x) as directed by the serving base station 60-6 without any interruption to the data communication exchange of the subscriber station 84.

It is to be understood that signaling message exchanges between serving base station and the hand-off base station may ideally be over X2 and S1 interface which supports both user plane and control plane signaling.

As a further example, assuming that a subscriber station 73 which was served by the serving base station 60-6, immediately a while ago has been in movement towards the direction of the neighboring hand-off base station 60-1. As the subscriber station 73 exits the cell edge of serving base station 60-6, signaling message exchanges between serving base station 60-6, the subscriber station 73 and the hand-off base station 60-1 ensures that the subscriber station 73 switches to hand-off frequency (x) without any interruption to the data communication exchange of the subscriber station 73 while it transits the hand-off region 30. As soon as the subscriber station 73 enters the cell edge of the hand-off base station 60-1, signaling message exchanges between the hand-off base station 60-1 and the subscriber station 73 ensures that the subscriber station 73 switches to any of the assigned carrier frequencies (F-x) as directed by the hand-off base station 60-1 in its capacity as serving base station to the new incoming subscriber station 73 without any interruption to the data communication exchange of the subscriber station 73.

In this way, the hand-off base station 60-1 co-ordinates with the other serving base stations 60-2 to 60-7 and the subscriber stations within the hand-off region 30 on the handover parameters like signal strength, data rates and other quality of service (QoS) requirements. Similarly the serving base stations 60-1, 60-2 to 60-7 co-ordinates with the hand-off base station 60-1 within the hand-off region 30 on the handover parameters like signal strength, data rates and other quality of service (QoS) requirements. The transiting of subscriber stations from complete coverage area 23 to hand-off region 30 and vice-versa may be accomplished by existing normal handover procedures.

The hand-off frequency (x) broadcasted by the hand-off base station 60-1 and the assigned frequencies (F-x) broadcasted by the serving base stations 60-1, 60-2 to 6-7 ensures that no subscriber stations, either stationary or in movement, are left without any radio coverage within the geographical area 10. Any subscriber station is free to move within the above wireless communication system deployed in a geographical area without any interruption to the data communication between the subscriber station and the hand-off or serving base stations.

It should be noted that the hand-off frequency (x) used in transiting of any subscriber station within the hand-off region 30 may also be a set of frequencies distinctively used for uplink and downlink between the subscriber station and the hand-off base station respectively, at varying time-slots using time division multiplexing (TDM) methods. Several such subscriber stations may transit the hand-off region 30 at any given moment and as an illustration few such subscriber stations 70, 71, 73, 74 and 75 are shown in FIG. 4 moving within the hand-off region 30, whose movement is undertaken either in or out of any serving base stations as indicated by directional arrows.

Figure 5:
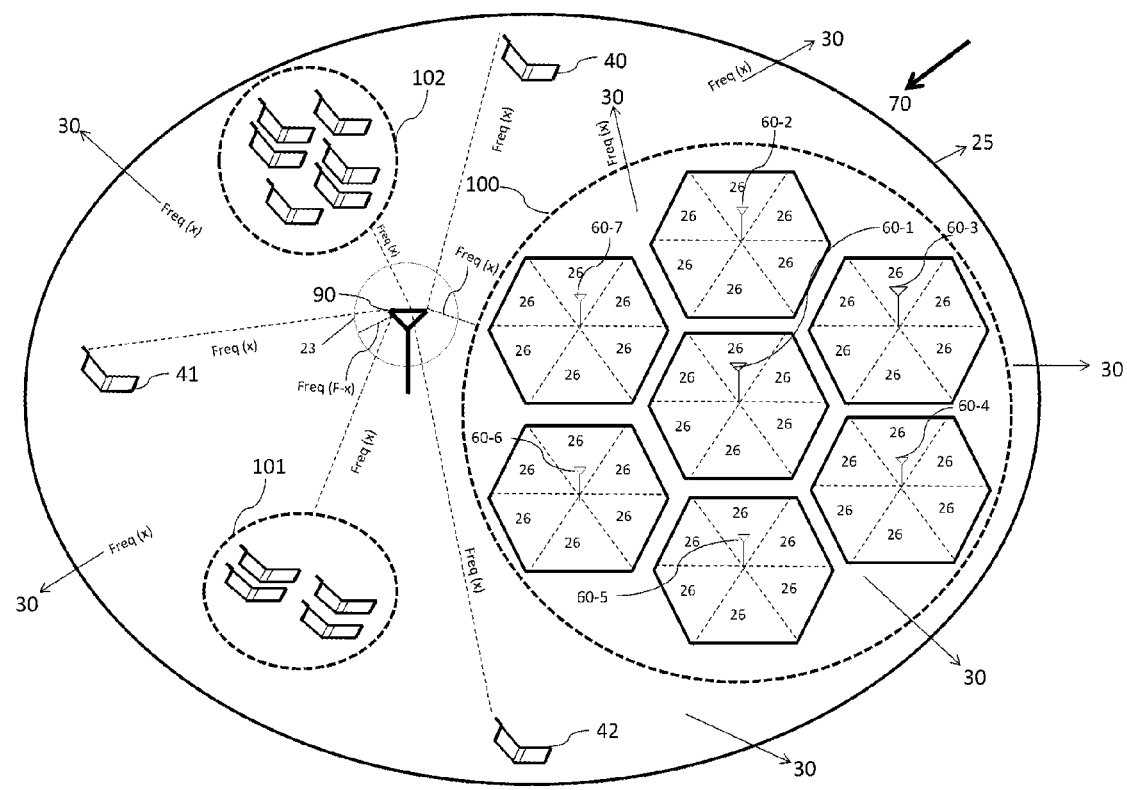
FIG. 5 illustrates a wireless communication system advantageously deployed in a geographical area embodying the principles of the invention.

FIG. 5 illustrates a wireless communication system advantageously deployed in a geographical area 25 embodying the principles of the invention. The geographical area 25 typically illustrates localities with very high and very low subscriber station densities. An assumption can be made that, within the geographical area 25, the subscriber stations can be segregated into high dense area 100 typically covering a city, wherein the service provider deploys the wireless communication system as illustrated in FIGS. 3 and 4 with the exception that the hand-off base station 90 is located in a strategic point outside the high dense area 100 such that it transmits the hand-off frequency (x) to an extent covering the entire geographical area 25 with a certain transmission power.

Surrounding the high dense area 100 there is likelihood of low dense subscriber stations 101 and 102 separated at a distance typically illustrating a village. Few remote subscriber stations 40, 41 and 42 may be at the extremes of the geographical boundary 25. In the above scenario, providing a base station at each of the low dense 101, 102 and remote subscriber stations 40, 41, 42 would not be advantageous to the service provider. Instead, a hand-off base station 90 broadcasting the hand-off frequency (x) covering the entire geographical area would serve low dense subscriber stations 101, 102 and the remote subscriber stations 40, 41, 42 in addition to providing hand-off frequency (x) services to other serving base stations 60-1 to 60-7 located within high dense area 100 as explained with respect to FIGS. 3 and 4.

It should be noted that the hand-off frequency (x) used in such low dense and remote subscriber stations within the hand-off region 30 can also be a set of frequencies distinctively used for uplink and downlink between the subscriber station and the hand-off base station respectively, at varying time-slots using time division multiplexing (TDM) methods.

Whenever a subscriber station move towards the hand-off base station 90 and comes within the range of its cell 23, the signaling exchanges between the nearing subscriber station and the hand-off base station ensures that the incoming subscriber station switches to any of the assigned carrier frequencies (F-x) as directed by the hand-off base station 90 in its capacity as serving base station to the new incoming subscriber station without any interruption to the data communication exchange of the subscriber station. In this way, the hand-off base station 90 co-ordinates with the other serving base stations 60-1 to 60-7 and the subscriber stations within the hand-off region 30 on the handover parameters like signal strength, data rates and other quality of service (QoS) requirements. The transiting of subscriber stations from hand-off frequency (x) in the region 30 to assigned frequencies (F-x) and vice-versa may be accomplished by existing normal handover procedures.

Thus the hand-off base station 90, in addition to performing the functions with respect to hand-off frequency (x) also performs as serving base station to the subscriber stations coming within the fold of its assigned frequency (F-x) in the capacity as serving base station. The hand-off frequency (x) radiated by the hand-off base station 90 and the assigned frequencies (F-x) broadcasted by the serving base stations 60-1 to 60-7 including the hand-off base station 90 ensures that no subscriber stations, either stationary or in movement, are left without any radio coverage within the geographical area 25. Any subscriber station is free to move within the above wireless communication system deployed in a geographical area without any interruption to the data communication between the subscriber stations and the hand-off or serving base stations.

In the above scenario explained with respect to FIG. 5, it is to be noted that, with the addition of the hand-off frequency (x) spanning the entire geographical area 25 and all the assigned carrier frequencies (F-x) deployed in each sector of each cell in the high dense area 100, achieves one hundred percent spectral efficiency within each sector or cell. For the remote subscriber stations 40, 41, 42 and for subscriber stations in low dense areas 101 and 102, the usage level is quite minimal so that the hand-off frequency (x) alone is sufficient to meet the quality of service (QoS) requirements of the subscriber stations. This saves the cost of deploying base stations at all low dense and remote locations within the geographical area 25.

Another embodiment of the invention relates to the implementation of the above described various embodiments using hardware and software. It is recognized that the various embodiments of the invention may be implemented or performed using computing devices (processors). The processor can be coupled to a transceiver, such as a receiver and a transmitter. In general, components such as processors and transceivers are well-known. For example, processing units are known to comprise basic components such as, but not limited to, microprocessors, microcontrollers, memory devices, and/or logic circuitry. A processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention. It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method for bandwidth allocation in a wireless communication system, the method comprising:

anointing a base station, from a plurality of base station serving a service area, as a hand-off base station, wherein the service area comprises at least two cells and is allocated a bandwidth to service wireless devices in the service area, wherein one of the at least two cells comprises a first base station of the plurality of base stations, the first base station configured to service wireless devices in a first portion of the service area using a first portion of the allocated bandwidth, and wherein second of the at least two cells comprises a second base station of the plurality of base stations, the second base station configured to service the wireless devices in a second portion of the service area using a second portion of the allocated bandwidth, wherein anointing the base station from the plurality of base station serving a service area as the hand-off base station comprises anointing the first base station serving one of the at least two cells as the hand-off base station, wherein each of the at least two cells comprises an array of at least six directional sector antennas, wherein the at least six directional sector antennas are configured to radiate into a sub-portion of the cell at sixty-degree arc comprising a sector, wherein the sector has its own dedicated frequency assigned from the first portion of the allocated bandwidth;

assigning a third portion of the allocated bandwidth as a hand-off frequency to the hand-off base station (HBS), wherein the HBS is configured to hand-off a subscriber between the at least two cells located in the service area wherein the hand-off is triggered when a received signal strength at the dedicated serving base station or at the hand-off base station is below an acceptable value, wherein assigning the third portion of the allocated bandwidth comprises assigning the third portion comprising a hand-off frequency to the first base station; and controlling signal transmission strength of the plurality of base stations, wherein controlling the signal transmission strength comprises:

controlling the signal transmission strength of the first base station such that a broadcast carrier frequency of the first portion of the allocated bandwidth covers only the first portion of the service area, controlling the signal transmission strength of the second base station such that the broadcast carrier frequency of the second portion of the allocated bandwidth covers only the second portion of the service area, and wherein controlling the signal transmission strength of the first base station further comprises controlling the signal transmission strength of the first base station such that the broadcast carrier frequency of the third portion of the allocated bandwidth the hand-off frequency comprising covers the entire service area, wherein the first base station performs dual transmission comprising a first transmission at the assigned third portion of the allocated bandwidth and a second transmission of assigned of the first portion of the allocated bandwidth.

2. The method of claim 1 wherein the hand-off base station co-ordinates with the serving base station for improving the signal strength in the serving area.

3. The method of claim 1, wherein each of the at least two cells is a hexagonal shape geographical area.

4. The method of claim 1, further comprising handing off a subscriber from the second base station to a third base station when a received signal strength for the subscriber within a cell area associated with the second base station falls below an acceptable value.

5. The method of claim 4, wherein handing off the subscriber from the second base station to the third base station comprises temporarily switching the subscriber from the second portion of the allocated bandwidth to the third portion of the allocated bandwidth comprising the hand-off frequency.

6. The method of claim 5, further comprising switching the subscriber from the third portion of the allocated bandwidth comprising the hand-off frequency to a fourth portion of the allocated bandwidth associated with the third base station.

7. The system of claim 5, wherein the processor is further configured to hand-off a subscriber from the second base station to a third base station when a received signal strength for the subscriber within a cell area associated with the second base station falls below an acceptable value.

8. The system of claim 7, wherein the processor is further configured to hand-off a subscriber from the second base station to a third base station when a received signal strength for the subscriber within a cell area associated with the second base station falls below an acceptable value.

9. The system of claim 8, wherein the processor being configured to hand-off the subscriber from the second base station to the third base station comprises the processor being configured to temporarily switch the subscriber from the second portion of the allocated bandwidth to the third portion of the allocated bandwidth comprising the hand-off frequency.

10. The system of claim 9, wherein the processor is further configured to the subscriber from the third portion of the allocated bandwidth comprising the hand-off frequency to a fourth portion of the allocated bandwidth associated with the third base station.

11. A wireless communication system comprising:

a plurality of base stations serving a service area, wherein each of the plurality of base stations associated with one of a plurality of cells of the service area, each of the plurality of cells being separated by a distance such that each of the plurality of cells has a complete coverage area surrounding an associated service base station and a hand-off region in between complete coverage area, wherein a first cell of the plurality of cells comprises an array of at least six directional sector antennas, wherein the at least six directional sector antennas are configured to radiate into a sub-portion of the cell at sixty-degree arc comprising a sector, wherein the sector has its own dedicated frequency assigned from the first portion of the allocated bandwidth;

wherein the wireless communication system is configured to:

select one of the plurality of base stations as a hand-off base station for the service area, wherein the wireless communication system configured to select one of the plurality of base stations as the hand-off base station comprises the wireless communication system configured to elect a first base station serving the first cell of the plurality of cells as the hand-off base station;

assign a first portion of an allocated bandwidth to the hand-off base station, wherein the wireless communication system configured to assign the first portion of the allocated bandwidth to the hand-off base station comprises assigning a hand-off frequency to the first base station;

assign a second portion of the allocated bandwidth to the first base station associated with a first cell of the plurality of cells, the first cell comprising a first portion of the service area wherein the first base station performs dual transmission comprising a first transmission at the assigned second portion of the allocated bandwidth and a second transmission of assigned of the hand-off frequency comprising the first portion of the allocated bandwidth;

assign a third portion of the allocated bandwidth to a second base station associated with a second cell of the plurality of cells, the second cell comprising a first portion of the service area;

control signal transmission strength of the plurality of base stations, wherein the wireless communication system configured to control the signal transmission strength comprises the wireless communication system configured to:

control the signal transmission strength of the first base station such that a broadcast carrier frequency of the second portion of the allocated bandwidth covers only the first portion of the service area, control the signal transmission strength of the second base station such that the broadcast carrier frequency of the third portion of the allocated bandwidth covers only the second portion of the service area, and wherein the wireless communication system being configured to control the signal transmission strength of the first base station further comprises the wireless communication system being configured to control the signal transmission strength of the first base station such that the broadcast carrier frequency of the hand-off frequency comprising the first portion of the allocated bandwidth covers the entire service area; and wherein the wireless communication system is configured to hand-off a subscriber from the serving base station of one of the plurality of cells to the hand-off base station when a received signal strength for the subscriber within a cell area associated with the serving base station falls below an acceptable value.

12. The system of claim 11, wherein each of the plurality of cells is a hexagonal shape geographical area.

13. A system comprising:

a processor;

a memory coupled to the processor, wherein the memory comprises instructions which when executed configures the processor to:

elect a base station, from a plurality of base station serving a service area, as a hand-off base station, wherein the service area comprises at least two cells and is allocated a bandwidth to service wireless devices in the service area, wherein one of the at least two cells comprises a first base station of the plurality of base stations, the first base station configured to service wireless devices in a first portion of the service area using a first portion of the allocated bandwidth, wherein second of the at least two cells comprises a second base station of the plurality of base stations, the second base station configured to service the wireless devices in a second portion of the service area using a second portion of the allocated bandwidth, wherein a first cell of the at least two cells comprises an array of at least six directional sector antennas, wherein the at least six directional sector antennas are configured to radiate into a sub-portion of the cell at sixty-degree arc comprising a sector, wherein the sector has its own dedicated frequency assigned from the first portion of the allocated bandwidth, and wherein the processor being configured to elect the base station from the plurality of base station serving the service area as the hand-off base station comprises the processor being configured to elect the first base station serving the first cell of the at least two cells as the hand-off base station;

assign a third portion of the allocated bandwidth as a hand-off frequency to the hand-off base station (HBS), wherein the HBS is configured to hand-off a subscriber between the at least two cells located in the service area, wherein the hand-off is triggered when a received signal strength at the dedicated serving base station or at the hand-off base station is below an acceptable value, wherein the processor being configured to assign the third portion of the allocated bandwidth comprises the processor being configured to assign the third portion of the allocated bandwidth comprising a hand-off frequency to the first base station; and control signal transmission strength of the plurality of base stations, wherein the processor being configured to control the signal transmission strength comprises the processor being configured to:

control the signal transmission strength of the first base station such that a broadcast carrier frequency of the first portion of the allocated bandwidth covers only the first portion of the service area, control the signal transmission strength of the second base station such that the broadcast carrier frequency of the second portion of the allocated bandwidth covers only the second portion of the service area, and wherein the processor being configured to control the signal transmission strength of the first base station further comprises the processor being configured to control the signal transmission strength of the first base station such that the broadcast carrier frequency of the hand-off frequency comprising the first portion of the allocated bandwidth covers the entire service area, wherein the first base station performs dual transmission comprising a first transmission at the assigned third portion of the allocated bandwidth and a second transmission of assigned of the first portion of the allocated bandwidth.

14. The system of claim 13, wherein each of the first cell is a hexagonal shape geographical area.

* * * * *